United States Patent [19]

Andrianov et al.

[11] 4,062,813

[45] Dec. 13, 1977

[54] SEMICONDUCTOR MATERIAL

[76] Inventors: Kuzma Andrianovich Andrianov, Vystavochny pereulok, 3, kv. 9, Moscow; Mikhail Izmailovich Topchiashvili, ulitsa Tashkentskaya 27/12, pod'ezd 3, Tbilisi; Lotary Mikhailovich Khananashvili, ulitsa Sumskaya 6, korpus 2, kv. 244, Moscow; Alexei Vladimirovich Danilov, Izmailovsky bulvar, 56, kv. 20, Moscow; Evgeny Ivanovich Ryabtsev, ulitsa Zelenodolskaya 11/16, kv. 15, Moscow; Dali Georgievna Pagava, ulitsa Tskhvedadze, 30; Dzhimsher Shalvovich Bodzhgua, ulitsa Iosebidze, 78, both of Tbilisi; Veniamin Demyanovich Grigoriev, ulitsa Dzerzhinskogo, 16, kv. 14; Vladimir Mikhailovich Fridland, ulitsa Gospitalnaya, 32, kv. 10, both of Kazan, all of U.S.S.R.

[21] Appl. No.: 678,722

[22] Filed: Apr. 20, 1976

Related U.S. Application Data

[63] Continuation of Ser. No. 447,046, Feb. 28, 1974, abandoned.

[51] Int. Cl.$^2$ ............................................. H01B 1/06

[52] U.S. Cl. .................................. 252/511; 252/512; 252/518

[58] Field of Search ............... 252/511, 500, 512, 513, 252/514, 518; 260/46.5 G

[56] References Cited

U.S. PATENT DOCUMENTS

| | | | |
|---|---|---|---|
| 3,280,072 | 10/1966 | Frankland | 260/46.5 |
| 3,609,104 | 9/1971 | Ehrreich | 252/511 |
| 3,766,095 | 10/1973 | Mastrangelo | 252/512 X |
| 3,919,122 | 11/1975 | Tigner | 252/512 |
| 3,978,378 | 8/1976 | Tigner et al. | 252/512 |

FOREIGN PATENT DOCUMENTS

| | | | |
|---|---|---|---|
| 957,108 | 5/1964 | United Kingdom | 250/37 SB |

*Primary Examiner*—Benjamin R. Padgett
*Assistant Examiner*—E. Suzanne Parr
*Attorney, Agent, or Firm*—Haseltine, Lake & Waters

[57] ABSTRACT

Semiconductor material consists of polyvinyldimethylsiloxane rubber, filler material conducting electricity, and a curing agent. Said curing agent is dialkylaminomethyltrialkoxysilane. The components of the proposed material are taken in the following proportion, in part by weight:

polyvinyldimethylsiloxane rubber: 100
filler conducting electricity: 20–100
dialkylaminomethyl trialkoxysilane: 0.5–4.

10 Claims, No Drawings

SEMICONDUCTOR MATERIAL

This application is a continuation of application Ser. No. 447,046, filed Feb. 28, 1974, now abandoned.

This invention relates to semiconductor materials and more particularly to organo-element semiconductor material.

Semiconductor materials are prepared by introducing into organic polymers substances having low specific electric resistance, such as metals, their salts, conducting carbon black, graphite.

Unlike metallic conductors and semiconductors, organo-element semiconductor materials have the following advantages: greater corrosion resistance, better workability, low specific gravity, and high elasticity (low modulus of elasticity).

Semiconductor materials can be used in industry to control static electricity and formation of ice, as materials absorbing radio waves, and also to solve complicate problems by the method of electrohydrodynamic analogies.

Known in the prior art is a semiconductor material consisting of polyvinyldimethylsiloxane rubber, acetylene black, and a curing agent - benzoyl peroxide.

This material is prepared by the method of hot rolling. The rolled mass is then pressed into sheets at a temperature of 150°–250° C.

The disadvantage of the known method is heterogeneity of the electrical properties, for example of the specific electrical resistance across the sheet plane.

The object of the present invention is to work out a new semiconductor material possessing higher homogeneity of electrical properties.

Another object of the invention is to prepare semiconductor material having increased sensitivity of the electrical resistance with respect to elevated temperatures.

These and other objects of the invention have been attained in that in semiconductor material consisting of polyvinyldimethylsiloxane rubber, conductive filler material and a curing agent, according to the invention dialkylaminomethyl trialkoxysilane is used as the curing agent and the said components are taken in the following proportion, in parts by weight:

polyvinyldimethylsiloxane rubber:100
filler material conducting electricity:20–100
dialkylaminomethyl trialkoxysilane:0.5–4.

The proposed curing agent makes it possible to prepare the proposed semiconductor material by cold rolling.

The proposed material is prepared with the use of a solvent which ensures maximum homogeneity of the mass and its subsequent orientation under the action of the rollers, as a result of which sheets of the semiconductor material possess the desired electrical properties.

The proposed semiconductor material possesses higher sensitivity of the electrical resistance with respect to elevated temperatures. This material can withstand for long periods of time the action of temperatures within the range from minus 80° to plus 250° C. This valuable property, alongside with the increased homogeneity of the electrical properties, make it possible to use the proposed material for the manufacture of low-temperature heating elements working for lengthy periods at temperatures from 80° to 100° C, for de-iceing in aviation, ship building, car building, etc.

A special device made of the proposed material can be used to heat various liquids and gases.

The proposed semiconductor material has the relay effect, which is reversible.

These properties are due to non-linearity of the volt-ampere characteristics of the proposed material. Said properties make it possible to use the material in electrical ensineering devices, various automatic systems, signalization, protection, for obtaining current pulses of variable length and magnitude, etc.

Owing to the relay effect, the risk of spontaneous ignition of the material in cases of increased tension (and temperature) is ruled out.

The proposed material has increased tensosensitivity, which makes it possible to use the proposed material in industry as a tensosensitive transmitter. The proposed semiconductor material can be shaped into sheets, tubes various articles, and it can also be used to protect surfaces by coats of variable thickness (from 10 millimicrons to 10 mm).

The proposed semiconductor material is prepared by the following procedure.

Polyvinyldimethylsiloxane rubber is dissolved in a mixer in a non-polar organic solvent. Filler material conducting electricity is then added into the solution, and finally a curing agent is introduced. The curing agent is dialkylaminomethyl trialkoxysilane, for example, diethylaminomethyl triethoxysilane. Dimethylaminomethyl triethoxysilane, dibutylaminomethyl triethoxysilane, dipropylaminotriethoxysilane can also be used for the purpose. In the capacity of the material conducting electricity, use can be made of blacks, graphites, metals or their salts. The components are mixed thoroughly into a paste-like mass which is cold-rolled at a temperature of 5°–40° C or passed through a screw which shapes them into the required articles.

Thus obtained material is retained in the following conditions:
at 100° C for 2 hours;
at 120° C for 2 hours;
at 150° C for 4 hours;
at 200° C for 4 hours.

For a better understanding of the invention it will be illustrated by examples of its practical embodiment which follow hereinafter:

EXAMPLE 1

100 parts by weight of polyvinyldimethylsiloxane rubber are dissolved in 200 parts by weight of toluene, and 80 parts by weight of lamp black are added. The components are mixed into a paste-like mass and four parts by weight of diethylaminomethyl triethoxysilane are added. The mass is mixed again until a homogeneous mixture is obtained, which is then rolled at a temperature of 20° C ± 5° C and retained at elevated temperatures.

The obtained semiconductor material has the specific electrical resistance from 10 to $10^2$ ohm × cm.

EXAMPLE 2

100 parts by weight of polyvinyldimethylsiloxane rubber are dissolved in 100 parts by weight of toluene, and 20 parts of lamp black are added into the solution. The components are mixed into a paste-like mass.

Then one part by weight of diethylaminomethyl triethoxysilane is added and the components are mixed to prepare a homogeneous mass, which is then rolled at a temperature 20°±5° C and retained at elevated temperatures. Thus prepared semiconductor material possesses high specific electrical resistance of $10^5$ to $10^7$ ohm × cm.

We claim:

1. A semiconductor material consisting of polyvinyldimethylsiloxane rubber, filler material conducting electricity and a curing agent, which is dialkylaminomethyl trialkoxysilane, said components being taken in the following proportion (parts by weight):

polyvinyldimethylsiloxane rubber:100
electrically-conducting filler material:20–100 and a
dialkylaminomethyl trialkoxysilane:0.5–4, said filler material being selected from the group consisting of carbon blacks, graphites, metals and metal salts, and said dialkylaminomethyl triethoxysilane being selected from the group consisting of diethylaminomethyl triethoxysilane, dimethylaminomethyl triethoxysilane, dibutylaminomethyl triethoxysilane, and dipropylamino-triethoxysilane.

2. A material according to claim 1 wherein said filler is carbon black.

3. A material according to claim 1 wherein said filler is a graphite.

4. A material according to claim 1 wherein said filler is a metal.

5. A material according to claim 1 wherein said filler is a metal salt.

6. A material according to claim 1 wherein said silane is diethylaminomethyl triethoxysilane.

7. A material according to claim 1 wherein said silane is dimethylaminomethyl triethoxysilane.

8. A material according to claim 1 wherein said silane is dibutylaminomethyl triethoxysilane.

9. A material according to claim 1 wherein said silane is dipropylamino triethoxysilane.

10. A process for preparing a semiconductor material consisting of polyvinyldimethylsiloxane rubber, filler material conducting electricity and a curing agent, said components being 100 parts by weight polyvinyldimethylsiloxane rubber, 20–100 electrically conductive filler material and 0.5–4 dialkylaminomethyl trialkoxysilane which comprises mixing a solution of the polyvinyldimethylsiloxane rubber with the electrically conductive filler material into a paste-like mass, adding the dialkylaminomethyl trialkoxysilane and mixing until a homogeneous mixture is obtained, shaping said mixture at from 5° to 40° C and then heating said material at temperatures of 100° C and then 120° C each for 2 hours and 150° C and then 200° C each for 4 hours.

* * * * *